United States Patent [19]
Nishibe et al.

[11] Patent Number: 4,904,855
[45] Date of Patent: Feb. 27, 1990

[54] METHOD FOR DETECTING RELATIVE POSITION OF AN IMAGE PAIR INCLUDING CONTRAST DETECTION

[75] Inventors: Takashi Nishibe; Shotaro Yokoyama, both of Kanagawa, Japan

[73] Assignee: Fuji Electric Co., Ltd., Kanagawa, Japan

[21] Appl. No.: 276,832

[22] Filed: Nov. 28, 1988

[30] Foreign Application Priority Data

Jan. 27, 1988 [JP] Japan ................................. 63-16249

[51] Int. Cl.⁴ .............................................. G01J 1/20
[52] U.S. Cl. ..................................... 250/201; 250/204
[58] Field of Search ............. 250/201 PF, 204, 201 R; 354/406, 407, 408; 356/1, 4

[56] References Cited

U.S. PATENT DOCUMENTS 4,358,675 11/1982 Frazier et al. ........................ 250/204
4,467,187 8/1984 Tsunekawa et al. ................. 250/204

FOREIGN PATENT DOCUMENTS

0298725 11/1989 European Pat. Off. .

Primary Examiner—David C. Nelms
Assistant Examiner—George Beck
Attorney, Agent, or Firm—Finnegan, Henderson, Farabow, Garrett and Dunner

[57] ABSTRACT

A method and system for finding an exact focus of a taking lens of a single lens camera or the like. The method detects the relative position between two images on the basis of light intensity distribution of the images from a pair of light sensor arrays that receive the images through light paths separated from each other in space. The relative position depends on whether a taking lens of a camera is in front-focus condition or in back-focus condition. Partial image data consisting of n data respectively are sampled from the two image data as verification data. A number of combinations of the data are used to calculate evaluation values indicative of the level of correlation between the respective verification data. Correct focus exhibits the highest correlation. The method overcomes the problem that the combination having the highest correlation may not be correctly determined due to abnormal shape or envelope of the plotted distribution of the evaluation value.

8 Claims, 4 Drawing Sheets

METHOD FOR DETECTING RELATIVE POSITION OF AN IMAGE PAIR INCLUDING CONTRAST DETECTION

BACKGROUND OF THE INVENTION

1. Field of the Invention

The present invention relates to a method and system for detecting the relative position of a pair of images which is suitable for an automatic focusing device of a camera, and more particularly to a method and system for detecting the relative position of the two images on the basis of a pair of image data indicative of light intensity distribution of the images from a pair of optical sensor arrays that receive the images through light paths separated from each other in space.

2. Description of Prior Art

Figure 3:
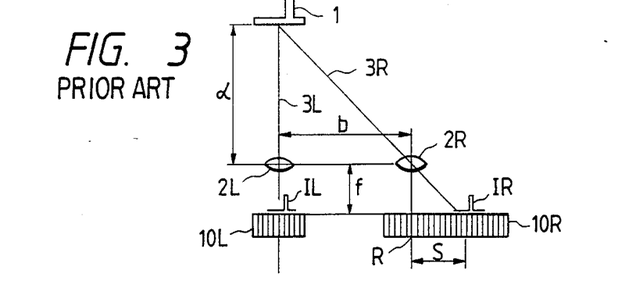
FIG. 3 to FIG. 5 are diagrams showing different applications of the method and system according to the invention.
Figure 4:
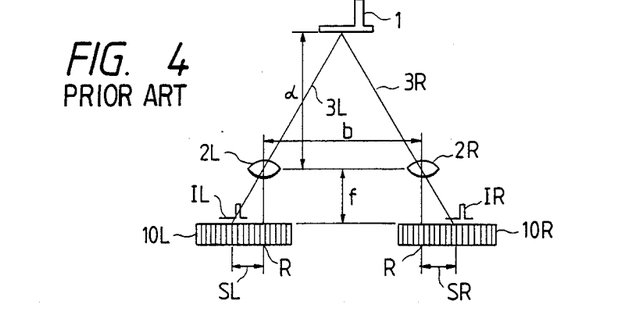
Figure 5:
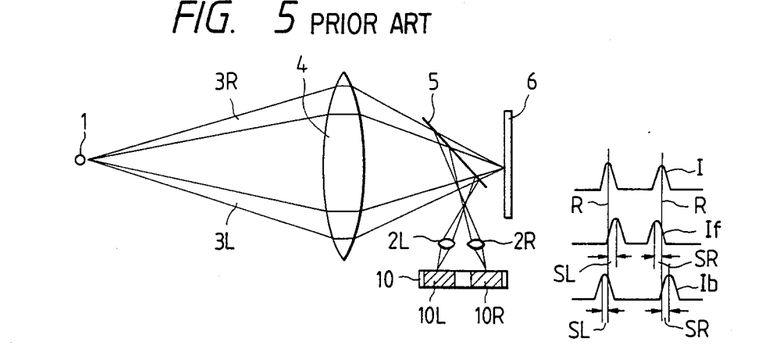

In a method for automatic focusing of a camera, a pair of optical sensor arrays receives the image of a subject through light paths separated from each other in space. The relative position of the images or the offset of the images from a reference point on the pair of sensor arrays is detected. Focusing of the camera lens is effected by using the relative position as a measure representing the distance and direction to the subject and an amount of the offset of the focal point of the lens. FIG. 3 to FIG. 5 show applied examples of this method for detecting the relative position of a pair of images.

FIG. 3 shows diagrammatically an example of detecting a distance d to a subject 1. A pair of small lenses 2L,2R, spaced apart by a distance b from each other, is mounted on a camera. The light from the subject 1 is received at the small lenses 2L,2R through different light paths 3L,3R. A pair of optical sensor arrays 10L,10R is placed at the focal points of the small lenses 2L,2R to form images IL,IR, respectively, thereon. Since the subject 1 is framed by a view finder so that the subject 1 is in front of the small lens 2L on the left, the image IL of the subject 1 is positioned at the same location on the optical sensor array 10L. The image IR, as apparent from the figure, occupies different locations on the optical sensor array 10R on the right in accordance with the distance d to the subject. In other words, the image IR on the optical sensor array 10R is offset from a reference position R at which the image is formed when the subject 1 is at an infinite distance. Thus the distance d can be found from a simple trigonometric formula, $d = b \cdot f/S$ where S is the amount of the offset of the image relative to the reference position R. Even so, the distance d is not actually calculated for focusing the camera, but rather the amount of offset S is directly used for focusing the lens.

FIG. 4 shows another example of detecting a distance where the subject 1 is not located in front of either the left small lens or the right small lens but is in front of an intermediate position between the two small lenses 2L,2R, for example. In this case, both of the images IL,IR on the two optical sensor arrays 10L,10R are, in transverse direction, offset from the reference position R at which an infinitely distant subject causes an image. It should easily be noted that the distance d can be determined by the aforementioned equation, $d = b \cdot f/S$ using the sum, $S = SL + SR$, of the offsets of the respective images IL and IR. It should also be noted that detecting the distance merely requires detecting the relative position between the images IL,IR or the offset of the images IL,IR on the optical sensor arrays 10L,10R from their reference positions.

FIG. 5 shows an example of detecting an out-of-focus condition in a single lens reflex camera, for example. A mirror 5 is placed between a taking lens 4 and a film 6. The light from the subject 1 reflected by the mirror 5 forms images through a pair of small lenses 2L,2R on the horizontally positioned sensor array portions 10L,10R of the optical sensor array 10. Although the images on these horizontally positioned light sensor array portions 10L,10R are formed through the taking lens 4, the optical sensor array portions 10L,10R receive the images through different portions of the lens 4 and separate light paths 3L,3R in space.

On the right of FIG. 5 are shown three cases of image locations on the optical sensor array depending on the focus of the lens 4. I shows the images when the lens 4 is in-focus. As apparent from the figures, the peak portions of the image If move closer to each other when the taking lens 4 is in front-focus condition, and the peak portions of the image Ib move away from each other when the taking lens is in back-focus condition. Thus, the amount of out-of-focus and the direction thereof, i.e., front or back, can be found by detecting the actual offsets SL,SR of the image peaks or the sum S of these offsets from the reference position R at which the image is in-focus. Detecting the amount of out-of-focus is, therefore, nothing but detecting the relative position of the images on the two light sensor arrays 10L,10R.

Figure 6:
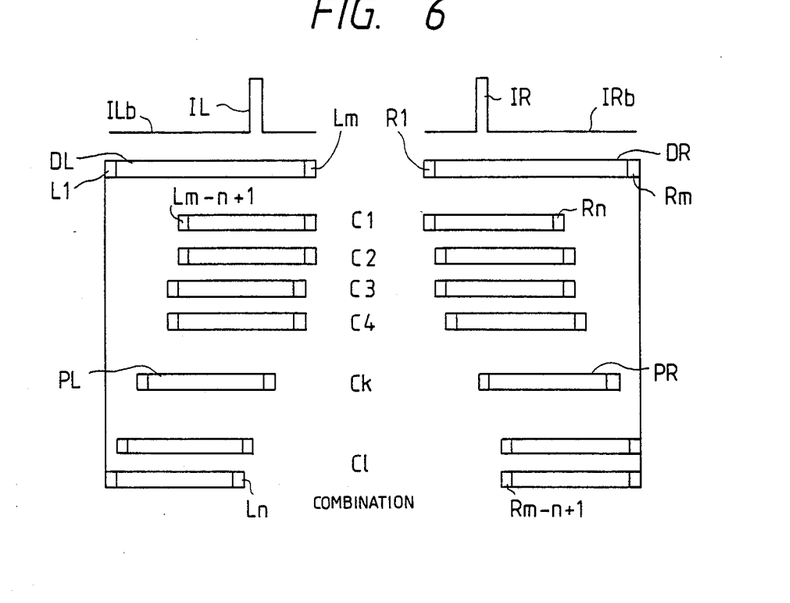
FIG. 6 is a diagram illustrating a combination of the verification data according to the invention.

FIG. 6 shows, by way of example, a method for finding the relative position of the images on the optical sensor array. The left and right image data DL,DR are each, by way of example, a collection of m data indicative of light intensity distribution of the images IL,IR. Images IL,IR are shown in a very simple shape as the images on the optical sensor arrays 10L,10R. In this example, the optical sensor arrays 10L,10R have the same number of light sensors as those in FIG. 4 and FIG. 5. Partial image data PL,PR consisting of n data, respectively, are sampled from the two image data DL,DR as verification data. The correlation between the verification data is examined in order to detect the the relative position of the image data DL,DR. Of course, m is greater than n, so there are a plurality of ways of sampling the verification data PL,PR from the image data DL,DR as shown in FIG. 6. Different combinations of these verification data sampled are defined as Ck (where k=1 to P) as shown. When sampling, both verification data consist of successive data on the optical sensor arrays. In successive combinations one of the verification data is shifted by one data alternately with the other verification data as shown. Since the number of data of the respective image data DL,DR is m and the number of data of the respective verification data PL,PR is n, there are m-n different ways of shifting. Therefore, there are $2(m-n)+1 = P$ different combinations, Ck, of the verification data. An evaluation value F indicates the level of correlation of the respective verification data PL,PR with respect to the combinations Ck. The following equation, for example, is used as an evaluation function for calculating the evaluation value F.

$$F = \overset{n}{\Sigma} |L_i - R_j| \tag{1}$$

where i and j are variables for specifying each data within the verification data PL,PR. For example, i and j vary from i=m−n+1 to m and j=1 to n at the first combination C1, to i=1 to n and j=m−n+1 to m at the final combination CP. The respective data Li,Rj are each, for example, 8-bit digital data. Where the above-mentioned evaluation function is used, the evaluation value is small when the verification data are of high correlation, and large when the verification data are of low correlation. This is apparent from the fact that the evaluation value F is equal to zero when n data of Li and Rj, respectively, of both verification data PL,PR are all coincident.

Figure 7:
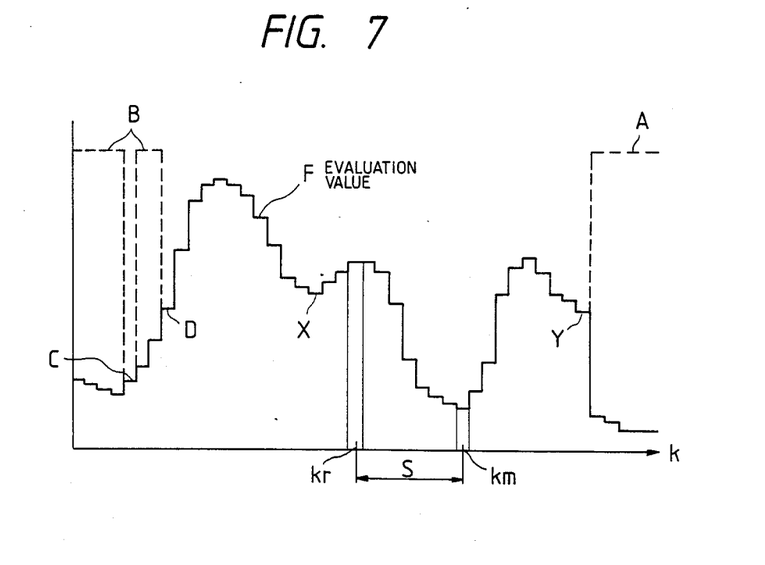
FIG. 7 is a graph comparing the evaluation value corrected by the correction means and a prior art evaluation value.

FIG. 7 shows an example in which the evaluation value F is in the abscissa and the variable k indicative of combinations is in the ordinate. The shape or the envelope of the plotted evaluation of F is, of course, dependent upon the shape of light intensity distribution of the images IL,IR and may be very uneven as shown. In this example, a low evaluation value indicates a high correlation. The lowest value implies that a position at which the n verification data PL,PR, i.e., the image portions corresponding to the n verification data PL,PR in the vicinity thereof, are almost completely coincident with each other has been found. Thus, taking the combination km having a minimum value, km actually indicates the relative position of the images on the two sensor arrays 10L,10R. The offset S between the images can be determined from the difference between the combination number km and the combination number kr corresponding to the reference position in the figure.

The offset S or the combination number km corresponding to the highest correlation thus obtained can be applied directly to focusing of the taking lens of a camera, for example. The combination number km and offsets are integers, but can be converted into fractional numbers through interpolation on the basis of the shape or the envelope of the plotted evaluation value F near the combination number km. In addition, if the optical sensor arrays 10L,10R each have a different number of light sensors, one fixed verification data consisting of n data is chosen, for example, from the image data DL from the left optical sensor array 10L that is assumed to have the lesser number of light sensors. The correlation evaluation value F is then calculated for combinations of the above verification data DL and m−n+1 verification data sampled from the image data DR, which consists of n data corresponding to the optical sensor array 10R on the right. The combination number km indicative of the highest correlation may be determined in exactly the same way as that mentioned above.

As apparent from the previous description, with a conventional method for detecting the relative position of a pair of images, a plurality of verification data are sampled from at least one of the image data of the subject on the left and right light sensor arrays, and then the combination that shows the highest correlation of all combinations of the verification data on the left and right is selected. In many cases, the combination of the highest correlation can be determined on the basis of the evaluation values F or a shape or the envelope that the plotted evaluation value F forms with respect to the combination number. The problem is that sometimes the combination having the highest correlation may not be correctly determined due to an abnormal shape or the envelope of the evaluation value F. This problem is often present where the subject is rather simple, which is the case when the images IL,IR are of a very simple shape and changes within the image are concentrated on one local portion with no significant changes in the rest of the image, as for example, a sight through a camera finder where one electric power pole is standing in the background of a blue sky or a monotonic wall.

Where there is not much change in the background of an image, if verification data including data corresponding only to this background is sampled by chance from the left and right image data, some data may substantially coincide with each other, resulting in a combination of a false highest correlation. FIG. 7 shows this situation at the left and right ends thereof, in which the evaluation value F is of a very low value for large combination numbers k at the right end, while for small combination numbers the evaluation value F is slightly larger than that for the highest correlation point km but has a local minimum value. In this manner, if there is not much change in the background of the subject, then a false highest correlation point of the same evaluation value as or very close to the true highest correlation point may sometimes appear. Thus, the conventional method may have some difficulty in detecting the true relative position of the image pair or cannot detect it at all.

SUMMARY OF THE INVENTION

Accordingly, it is an object of the present invention to provide a method and system which overcomes the aforementioned drawbacks to ensure detection of the relative position of a pair of images on an optical sensor array.

To achieve this and other objects and in accordance with the purpose of the invention, as embodied and broadly described herein, there is provided a method for detecting the relative position of the images incident upon a pair of optical sensor arrays on the basis of a pair of image data, the pair of image data comprising a plurality of data indicative of light intensity distribution of the images, the image data being output from a pair of optical sensor arrays that receive the images through separate light paths in space, the method comprising the steps of sampling a portion of at least one of the pair of image data and forming a plurality of combinations of verification data comprising a predetermined number of adjacent data on each optical sensor array, calculating an evaluation value indicative of the correlation between the verification data for every combination formed, detecting the amount of variation in the respective verification data and determining whether the data is of low contrast when the amount of variation in at least any one of the two verification data within the respective combination is smaller than a predetermined limit, correcting the evaluation value of the combination of verification data that has been determined to be of low contrast to a value indicative of low correlation, selecting a combination in which the verification data indicates the highest correlation from the plurality of combinations of verification data by using the corrected evaluation value, wherein the relative position of the images on the optical sensor arrays is detected on the basis of a number indicative of the combination selected.

The step of determining whether the data is of low contrast may comprise determining that the data is of low contrast only when the amount of variation in both of two verification data in the respective combination are smaller than the predetermined limit. Also, the step of selecting a combination may comprise selecting a combination as indicating the highest correlation only when neither of two combinations adjacent to the combination are decided to be of low contrast, or alternatively, only when an evaluation value of the combination is smaller than that of any one of two combinations adjacent to the combination.

A related system is also provided for detecting the relative position of the images incident upon a pair of optical sensor arrays on the basis of a pair of image data, the pair of image data comprising a plurality of data indicative of light intensity distribution of the images, the image data being output from a pair of optical sensor arrays that receive the images through separate light paths in space, comprising combining means for sampling a portion of at least one of the pair of image data and for forming a plurality of combinations of verification data comprising a predetermined number of adjacent data on each optical sensor array, calculation means for calculating an evaluation value indicative of the correlation between the verification data for every combination formed, decision making means for detecting the amount of variation in the respective verification data and for deciding whether the data is of low contrast when the amount of variation in at least any one of the two verification data within the respective combination is smaller than a predetermined limit, correction means for correcting the evaluation value of the combination of verification data which has been decided to be of low contrast to a value indicative of low correlation, selection means for selecting a combination in which the verification data indicates the highest correction from the plurality of combinations of verification data by using the corrected evaluation value, wherein the relative position of the images on the optical sensor arrays is detected on the basis of a number indicative of the combination selected.

The decision making means may be adapted to decide that the data is of low contrast only when the amount of variation of both of two verification data in the respective combinations are smaller than the predetermined limit. Also, the selection means may be adapted to select a combination as indicating the highest correlation only when neither of two combinations adjacent to the combination are decided to be of low contrast by the decision making means, or alternatively only when an evaluation value of the combination is smaller than that of any one of two combinations adjacent to the combination.

The accompanying drawings which are incorporated in and constitute part of this specification, illustrate one embodiment of this invention and, together with the description, serve to explain the principles of the invention. Other objects and advantages of the invention will be apparent from the following specification and from the drawings.

DESCRIPTION OF THE PREFERRED EMBODIMENT

An embodiment of the present invention will now be described with reference to FIG. 1 and FIG. 2. Sampling of the verification data from a pair of image data in this embodiment is carried out in a way similar to that shown in FIG. 6. In the embodiment described herein, all of the verification operations are carried out within hardware circuits. All or part of the verification operations, however, according to the invention, can be carried out within a programmed microcomputer or an equivalent computing means which reads the pair of image data.

Figure 1:
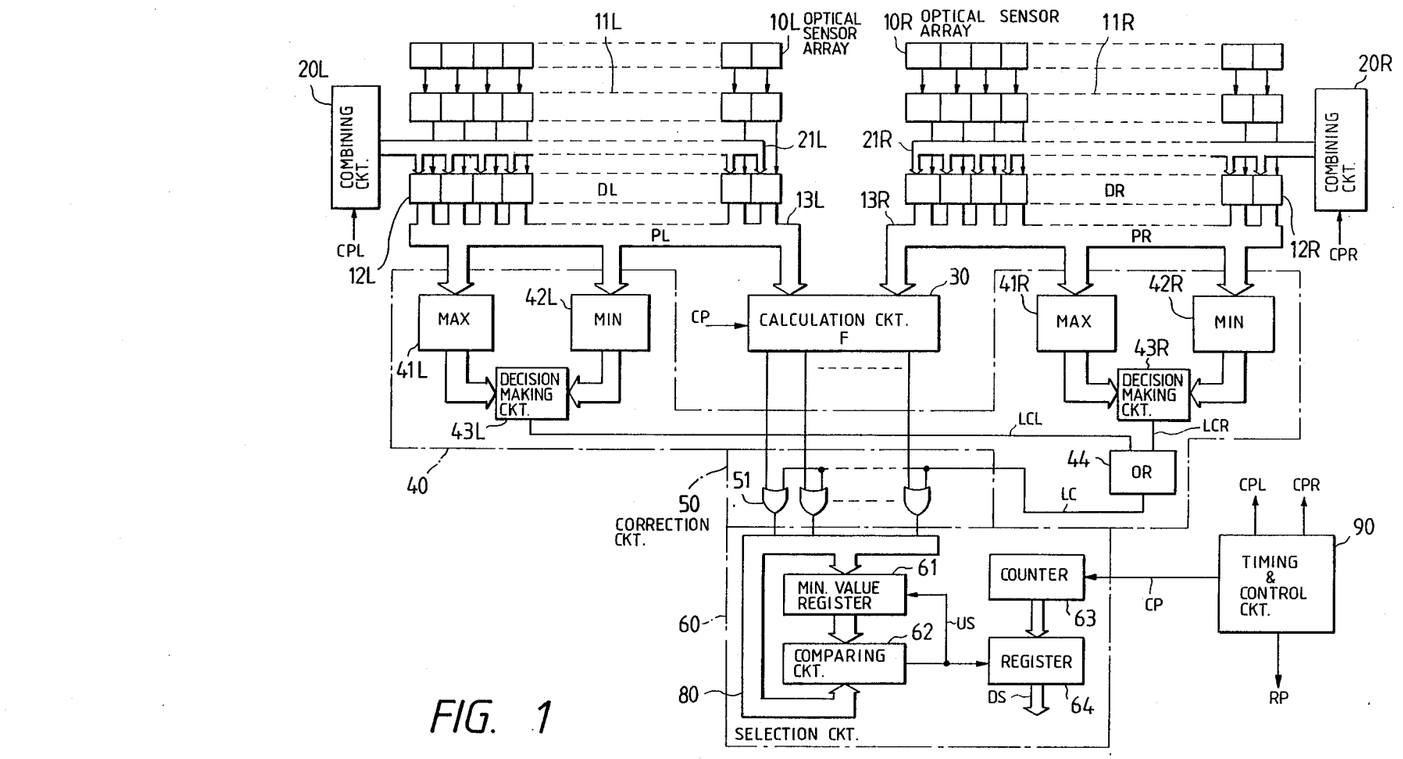
FIG. 1 is a block diagram illustrating an embodiment of the method and system for detecting the relative position of a pair of images.

A pair of optical sensor arrays 10L,10R consisting of m optical sensors, respectively, are shown at the top of FIG. 1. The image data DL,DR indicative of light intensity distribution of each one of the image pair which is formed on the optical sensor arrays, are stored into left and right latch groups 12L,12R consisting of m latches, respectively. The value of m is, for example, 64, and the respective latches are, for example, 8-bits. An A/D converter, for example, may be used to convert the photoelectric output from the respective optical sensors in the optical sensor arrays 10L,10R into the respective data of the image data. A group of converters 11L,11R of the charge storage type are provided between the optical sensor arrays and the latch groups in this embodiment, and the digital data after conversion are stored into the respective latches of the latch groups 12L,12R.

In accordance with the invention, a left and a right combining means, which make a pair with each other, are provided for sampling at least one of the pair of image data and for forming a plurality of combinations of verification data. As embodied herein, the combining means includes lenses or counters 20L,20R and address buses 21L,21R. Counters 20L,20R receive synchronized clock pulses CPL,CPR, respectively, supplied from a timing circuit or a control circuit 90. The count value is used to successively address the desired latches in the latch groups 12L,12R via address buses 21L,21R to cause each latch to output its stored data onto 8-bit buses 13L,13R sequentially. At this time, clock pulses CPL,CPR are supplied from the control circuit 90 to the counters 20L,20R so that the n data, which form the left and right verification data PL,PR corresponding to the respective combinations Ck shown in FIG. 6, are output one by one onto the buses 13L,13R. The actual value of n is 42, for example.

A calculation circuit 30 is provided for calculating an evaluation value indicative of the correlation between the verification data for every combination formed. As embodied herein, the calculation circuit 30 receives sequentially the data forming the verification data PL,PR that are output onto buses 80L,80R, and calculates the evaluation value F on the basis of the evaluation function shown in Eq. (1). The calculation circuit 30 outputs the evaluation value F of, for example, 14-bits.

The calculating circuit 30 may be formed by, for example, combining a subtraction circuit for taking the difference between the two data received from the left and right buses 13L,13R and an addition register for adding the subtraction result in order as required in accordance with the positive or negative sign of the subtraction result. The calculation circuit 30 is reset or initialized (not shown) in response to a clock pulse CP having a period longer than the clock pulse CPL,CPR supplied from the control circuit 90.

A decision making circuit 40 for detecting the amount of variation in the respective verification data and for deciding whether the data is of low contrast is also provided. The decision making circuit 40, enclosed by a dashed line, operates in synchronism with the clock pulse CP in a manner similar to the calculation circuit 30. The decision circuit 40 detects a maximum value and a minimum value from n data of the verification data PL,PR by means of maximum value detection circuits 41L,41R and minimum value detection circuits 42L,42R for receiving, respectively, the data on the left and right buses 13L,13R. The maximum value detection circuits and the minimum value detection circuits can be formed of, for example, a maximum value register and minimum value register, respectively, and a comparing circuit for comparing the contents of these registers with the data on the buses 13L,13R. The maximum value detection circuits and the minimum value detection circuits will renew the contents of the registers if the contents of the registers are greater or smaller than the data on the buses. The decision circuits 43L,43R can be formed of a subtraction circuit for calculating the difference between the verification result from the maximum value detection circuits 41L,41R and the verification result from the minimum value detection circuits 42L,42R, and a comparing circuit for comparing the absolute value of this difference with a predetermined limit value to set low contrast signals LCL,LCR to "1", respectively, when the difference is smaller than the limit value. When the respective verification data PL,PR are of low contrast, the decision circuit 43L,43R sets the low contrast signal to "1."

It is preferred to set the aforementioned limit value, which is loaded into the comparing circuit, to 10 to 15% of the maximum value that the respective data could take, or 25 to 38 when the data is expressed as 8-bits. A gate circuit 44 in the decision making circuit 30 receives the low contrast signals LCL,LCR from the two decision circuits 43L,43R to synthesize them into one low contrast signal LC. An OR gate is used for the gate circuit 44 for setting the low contrast signal LC to "1" when either of the verification data PL,PR is of low contrast. This gate circuit 44 may be implemented with an AND gate to set the low contrast signal to "1" only when both verification data PL,PR are of low contrast.

There is also provided a correction circuit 50 for correcting the evaluation value of the combination of verification data that has been decided to be of low contrast to a value indicative of low correlation. The correction circuit 50 is formed of 14 OR gates in this embodiment, and corrects all the bits of the evaluation value F of the calculation circuit 30 to "1" regardless of its current value. Thus, the correction circuit 30 corrects the evaluation value to a maximum value indicative of the lowest correlation. When the decision making circuit 40 decides with respect to a combination that one or both of the verification data PL,PR of the combination is of low contrast, the evaluation value F for the combination is corrected to a value indicative of the lowest correlation by the correction circuit 50. This particular combination can then be substantially eliminated from a group of data from which a combination indicative of the highest correlation is selected by the subsequent selection circuit 60. Of course, correcting the evaluation value F to the maximum value for elimination of this particular combination is not always required. The same result can also be obtained by correcting only the most significant bit of the evaluation value F to "1," thereby using only one OR gate for the correction circuit 50.

Also in accordance with the invention, a selection circuit 60, is provided for selecting a combination in which the verification data indicates the highest correlation by using the corrected evaluation value. The selection circuit 60, which receives the evaluation value F through the 14-bit bus 80 in this example, comprises a minimum value register 61, a comparing circuit 62, a counter 63, and an output register 64. The output register 64 outputs a detection data DS indicative of the detection result according to the present invention. The minimum value register 61 is a 14-bit register. All the bits of register 61 are set to "1" by a reset pulse RP from the control circuit 90 when the detection operations are initiated. The comparing circuit 62 compares the stored contents of the minimum value register 61 to all the evaluation values on the bus 80. When the evaluation value on the bus 80 is less than the stored contents of the minimum value register 61, the comparing circuit 62 sends out a renewal command US that loads the register 61 with the evaluation value on the bus 80. The counter 63 is, for example, a 6-bit counter, for storing a combination number, and counts the clock pulse CP the same as or in synchronism with that for the calculation circuit 30 and the decision circuit 40 after the counter 63 has been initialized. Thus, the counter 63 always stores the combination number that corresponds to the evaluation value F on the bus 80.

The output register 64 is, for example, a 6-bit register, the stored contents of which are replaced by the contents of the combination number counter 63 in response to the renewal command US from the comparing circuit 62. Therefore, the combination number corresponding to the minimum value of the evaluation value F that is stored in the minimum value register 61 is always stored in this output register 64. When the operations according to the present invention have been completed for all the combinations shown in FIG. 6, 45 different combinations in this example, a combination number indicative of the minimum evaluation value F or the highest correlation is in this output register. Thus, an external device has only to read the stored contents of the output register 64 to obtain data indicative of the detection result. This data detection result data can be used directly for the autofocus of a camera as described previously.

FIG. 7 shows the evaluation value F in a dotted line after it is corrected by the correction circuit 50 in this embodiment. The evaluation value F is very small in the prior art method in a range where the combination number k is large. The evaluation value F is increased, however, as shown by a line A as a result of the correction means in this embodiment because both the verification data PL,PR are of low contrast. Thus, there will be no chance that the evaluation value F in this range may be misrecognized as a combination number km, the combination of the highest correlation.

In the prior art method, the evaluation value F is also significantly low in a range where the combination number km is small. In this embodiment, one of the verification data PL,PR is of low contrast and the evaluation value is increased as shown in line B as a result of correction similar to the case of line A. Within this range, however, since only one of the two verification data is of low contrast, there is a rare case where the verification data is of low contrast for a trivial difference and the correction shown in FIG. 7 is not done. In the particular case shown in FIG. 7, the evaluation value that has not been corrected is slightly larger than the evaluation value corresponding to the highest correlation. Thus, the highest correlation can still be detected but such an ambiguous case should preferably be avoided.

Figure 2:
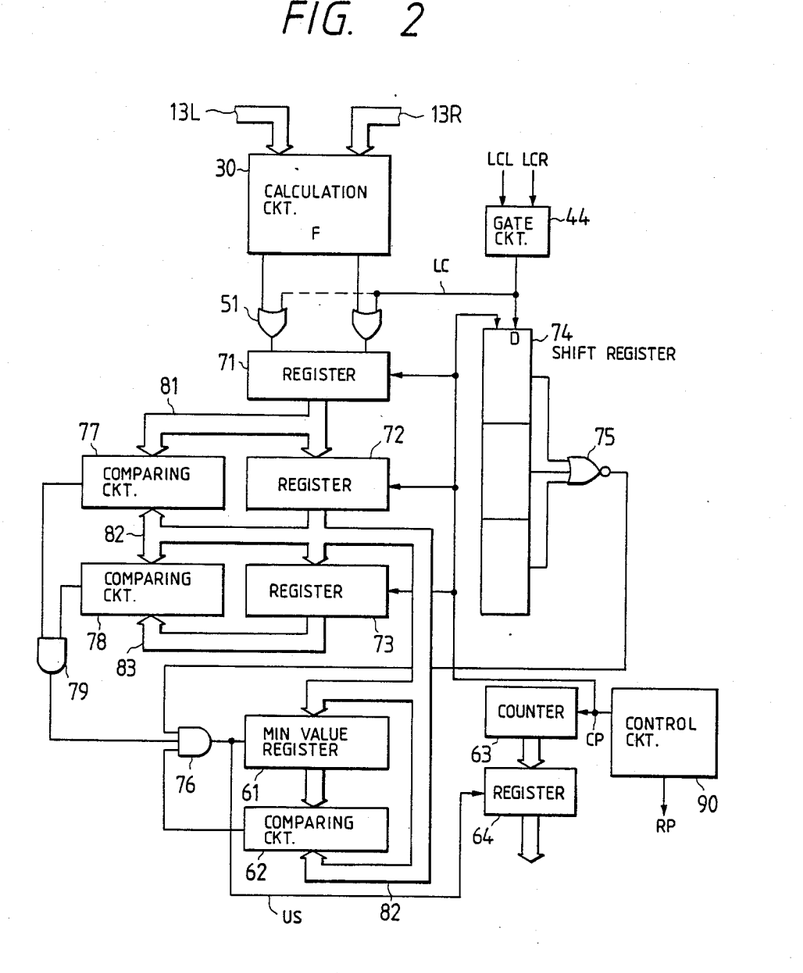
FIG. 2 is a block diagram showing another embodiment of the present invention.

FIG. 2 shows an embodiment of the invention that will overcome this drawback as well. In FIG. 2, only the portion of the circuit following the calculation circuit 30 and the gate circuit 44 of the correction circuit is shown. The evaluation value F, calculated by the calculation circuit 30 and corrected by the OR gate 51 of the correction means, is read into a register 71 of, for example, 14-bits in synchronism with the clock pulse CP from the control circuit 90 in this embodiment. Similarly, the stored contents of the register 71 are transferred to a next register 72 through a bus 81, and then to a further next register 73 through a bus 82. When an evaluation value F corresponding to a certain combination is stored in the register 71, the evaluation value F corresponding to the combination immediately preceding is stored in the register 72 and the evaluation value F for the combination two preceding is stored in the register 73. Provided to the right of these three registers is a three-stage shift register 74. The low contrast signal LC from the gate circuit 44 is supplied to the data input D of the shift register 74. The low contrast signal is transferred through the stages of the shift register 74 by the clock pulse CP which serves as a shift pulse. At each stage of the shift register 74, logic level "1" or "0" is stored to indicate whether the corresponding verification data is decided to be of low contrast or not. A NOR gate 75 receives the output of the respective stages of the shift register 74. Thus, the output of the NOR gate 75 is "1" only when the stored contents of all three stages are "0."

The minimum value register 61, the comparing circuit 62, the combination number counter 63, and the output register 64 are the same arrangement as previously described. The stored contents of the second register 72 is supplied as the evaluation value F to the circuits 61, 62, 63 through the bus 82. When the evaluation value F on the bus 82 is smaller than the stored value in the minimum value register 61, the comparing circuit 62 sends out a renewal command. In this embodiment, the output of an AND gate 76, which receives the output of the renewal command from the comparing circuit 62 and the output of the aforementioned NOR gate 75, is used as a renewal command US for replacing the stored contents of the minimum value register 61 by the stored contents of the output register 64. Additionally, the AND gate 76 receives the output of another AND gate 79, which will be described later.

As apparent from the above description, only when the stored contents of the respective stages of the shift register 74 are all "0", i.e., when none of the combinations corresponding to evaluation values stored in the registers 71 to 73 is decided to be of low contrast, will the stored contents of the minimum value register 61 be renewed by the evaluation value stored in the register 72 at the second stage. The stored value of the output register 64 is then also renewed to the combination number corresponding to the renewed evaluation value of the register 72. Therefore, in the case C shown in FIG. 7, since the combinations on both sides of C have been decided to be of low contrast, the low evaluation value for C is ignored in the course of detecting the highest correlation, thereby eliminating any chance of confusion.

Further to the embodiment in FIG. 2, comparing circuits 77 and 78 and AND gate 79 are added to renew the contents of the output register 64 and the minimum value register 61 only when the evaluation value is a local minimum. The comparing circuit 77 compares the evaluation value in the register 71 of the first stage and the evaluation value in the register 72 of the second stage. This circuit outputs a logic level "1" to the AND gate 79 when the second stage evaluation value is smaller than the first stage. Similarly, the comparing circuit 78 compares the evaluation value in the register 73 of the final stage and the evaluation value in the register 72 of the second stage. This circuit outputs a logic level "1" to the AND gate 79 when the second stage evaluation value is smaller than the final stage value. Thus, only when the evaluation value in the register 72 of the second stage is smaller than the evaluation values in the register of the first stage and in the register of the final stage, i.e., a local minimum, will the stored contents of the minimum value register be renewed by the renewal command US.

Referring to FIG. 7, as the combination number k is increased gradually, the renewal takes place only at the combination corresponding to D and combination number km of FIG. 7. Local minimums exist at points X and Y of FIG. 7, but the evaluation value corresponding to those points is not smaller than the evaluation value in the minimum value register 61. Renewing the evaluation value of the combination indicative of the highest correlation only when the evaluation value is a local minimum is not necessarily required in embodying the present invention, but is effective in ensuring determination of the highest correlation by the selection means.

As apparent from the embodiments thus far described, the embodiments are only exemplary and modifications may of course be made without departing from the scope of the invention. For example, substantially all the means of the invention may be incorporated as software within the calculation means. In the case where these means are implemented by hardware, they are not limited to the circuit arrangements shown, but may also be arranged properly by combining known arts.

By virtue of the arrangement thus far described, where combinations produced by the combining means include verification data corresponding to an image portion of low contrast having a monotonic background, if the combination is decided to be of low contrast by the decision means, the evaluation value for that particular combination which is calculated by the calculation means is corrected to a value indicative of low correlation by the correction means. Thus, there will be no chance of a false high correlation due to low contrast when a combination indicative of the highest correlation is determined by the selection means. Also, a combination indicative of a true highest correlation can be directly selected so that the relative position of an image pair on the optical sensor array is detected reliably without error. Therefore, there exists no chance that the detection operation of the relative position of the image pair will be confused by the low contrast portion of the image thereby causing indefinite or erroneous detection. The method and system according to the present invention are particularly useful for autofocusing optical equipment such as cameras. Application of the present invention can greatly improve precision in focusing and reliability of the autofocus operation.

What is claimed is:

1. A method for detecting the relative position of images incident upon a pair of optical sensor arrays on the basis of a pair of image data, the pair of image data comprising a plurality of data indicative of light intensity distribution of the images, the image data being output from a pair of optical sensor arrays that receive the images through separate light paths in space, the method comprising the steps of:

sampling a portion of at least one of the pair of image data and forming a plurality of combinations of verification data comprising a predetermined number of adjacent data on each optical sensor array;

calculating an evaluation value indicative of the correlation between the verification data for every combination formed;

detecting the amount of variation in the respective verification data and determining whether the data is of low contrast when the amount of variation in at least one of the two verification data within the respective combination is smaller than a predetermined limit;

correcting the evaluation value of the combination of verification data which has been determined to be of low contrast to a value indicative of low correlation;

selecting a combination in which the verification data indicates the highest correlation from the plurality of combinations of verification data by using the corrected evaluation value, wherein the relative position of the images on the optical sensor arrays is detected on the basis of the number indicative of the combination selected.

2. The method of claim 1, wherein the step of determining whether the data is of low contrast comprises determining the data to be of low contrast only when the amount of variation in both of two verification data within the respective combinations are smaller than the predetermined limit.

3. The method of claim 1, wherein the step of selecting a combination comprises selecting a combination as indicating the highest correlation only when neither of two combinations adjacent to the combination are decided to be of low contrast.

4. The method of claim 1, wherein the step of selecting a combination comprises selecting a combination as indicating the highest correlation only when the evaluation value of the combination is smaller than that of any one of two combinations adjacent to the combination.

5. A system for detecting the relative position of images incident upon a pair of optical sensor arrays on the basis of a pair of image data, the pair of image data comprising a plurality of data indicative of light intensity distribution of the images, the image data being output from a pair of optical sensor arrays that receive the images through separate light paths in space, comprising:

combining means for sampling a portion of at least one of the pair of image data and forming a plurality of combinations of verification data comprising a predetermined number of adjacent data on each optical sensor array;

calculation means for calculating an evaluation value indicative of the correlation between the verification data for every combination formed;

decision making means for detecting the amount of variation in the respective verification data and determining whether the data is of low contrast when the amount of variation in at least one of the two verification data within the respective combination is smaller than a predetermined limit;

correction means for correcting the evaluation value of the combination of verification data which has been determined to be of low contrast to a value indicative of low correlation;

selection means for selecting a combination in which the verification data indicates the highest correlation from the plurality of combinations of verification data by using the corrected evaluation value, wherein the relative position of the images on the optical sensor arrays is detected on the basis of the number indicative of the combination selected.

6. The system of claim 5, wherein the decision making means determines the data to be of low contrast only when the amount of variation in both of two verification data within the respective combinations are smaller than the predetermined limit.

7. The system of claim 5, wherein the selection means selects a combination as indicating the highest correlation only when neither of two combinations adjacent to the combination are decided to be of low contrast by the decision making means.

8. The system of claim 5, wherein the selection means selects a combination as indicating the highest correlation only when the evaluation value of the combination is smaller than that of any one of two combinations adjacent to the combination.

* * * * *